ively.
United States Patent
Kauer, Jr. et al.

[15] 3,659,399
[45] May 2, 1972

[54] FRACTIONATION BY ADSORPTION

[72] Inventors: George C. Kauer, Jr., Plainview, L.I.; Louis E. Brooks, Great Neck, both of N.Y.

[73] Assignee: Air Techniques Incorporated

[22] Filed: June 29, 1970

[21] Appl. No.: 50,392

[52] U.S. Cl. ........................................55/33, 55/62, 55/163
[51] Int. Cl. ...........................................................B01d 53/04
[58] Field of Search..................55/21, 33, 62, 162, 163, 179

[56] References Cited

UNITED STATES PATENTS

| | | | |
|---|---|---|---|
| 3,160,486 | 12/1964 | Busch, Jr. ..................................55/162 |
| 2,955,673 | 10/1960 | Kennedy et al. ............................55/62 |
| 3,472,000 | 10/1969 | Glass et al. ................................55/163 |
| 3,399,510 | 9/1968 | Kauer, Jr. et al. ..........................55/62 |
| 3,085,379 | 4/1963 | Kiyonaga et al. ..........................55/62 |

Primary Examiner—Charles N. Hart
Attorney—Marn & Jangarathis

[57] ABSTRACT

Duel adsorption tower fractionation of a compressed gaseous mixture; in particular dehydration of air, wherein one tower effects adsorption while the other tower is regenerated by a minor portion of the unabsorbed gas while the major portion is passed to a storage tank. The compressor is activated and deactivated in response to predetermined minimum and maximum pressures, respectively, in the storage tank, and the flow path is changed in response to deactivation of the compressor, whereby upon reactivation of the compressor, the functions effected in the towers are reversed. In a preferred embodiment, the flow path is controlled by a pilot operated valve which is pneumatically operated to change the flow paths.

12 Claims, 3 Drawing Figures

Fig. I.

INVENTOR.
George C. Kauer, Jr.
Louis E. Brooks
BY Marn & Jangarathis
ATTORNEYS

INVENTOR.
George C. Kauer, Jr.
Louis E. Brooks
BY  Marn & Jangarathis
ATTORNEYS

FRACTIONATION BY ADSORPTION

The invention relates to the fractionation by adsorption of a compressed gas, and in particular to a new and improved apparatus and process for fractionation of a compressed gas by the use of dual adsorption chambers.

The use of two adsorption chambers for fractionating a gas in which one adsorption chamber is employed for adsorbing a component of a gaseous mixture while the other chamber is regenerated by passing a portion of the unadsorbed gas therethrough at a reduced pressure, is known in the art, and is exemplified by U.S. Pat. No. 2,944,627, granted July 12, 1960. In such a system, compressed gas is directed through one adsorption chamber to effect adsorption of a component thereof, with a major portion of the unadsorbed gas being passed directly to utilization equipment and a minor portion of the unadsorbed gas being passed through a pressure reducing flow controller to a second chamber which has previously been employed for adsorption. The unadsorbed portion of the gas is passed through the adsorbent in the second chamber to effect desorption of the adsorbed component and the gas containing the desorbed component is then vented to atmosphere.

The apparatus is provided with piping and valves to alternately connect the two chambers to adsorption and desorption and the valves are generally solenoid operated valves which are activated by a cycle timing device which maintains each chamber, on each portion of the cycle, for a short period of time; for example, from 30-80 seconds.

The prior art dual tower systems have numerous disadvantages. Thus, for example, the desorption operation is continuous, even if the system is not using the unadsorbed portion of the gas, with the compressor running to meet desorption demands. In addition, such systems do not include a storage tank and in order to keep such systems operating under all probable load conditions, the regeneration must be designed for the maximum probable load condition, resulting in considerable waste in that the flow required for regeneration is excessive at all conditions, except maximum load.

Accordingly, an object of this invention is to provide a new and improved process and apparatus for desorbing a component of a gas, and in particular a process and apparatus which avoids the aforementioned disadvantages.

Another object of this invention is to provide a new and improved process and apparatus for effecting adsorption and desorption in dual adsorption chambers.

A further object of the invention is to provide a new and improved process and apparatus for switching from adsorption to desorption in a dual adsorption chamber operation.

These and other objects of the invention should be more readily apparent from reading the following detailed description thereof with reference to the accompanying drawings, wherein.

Figure 1:
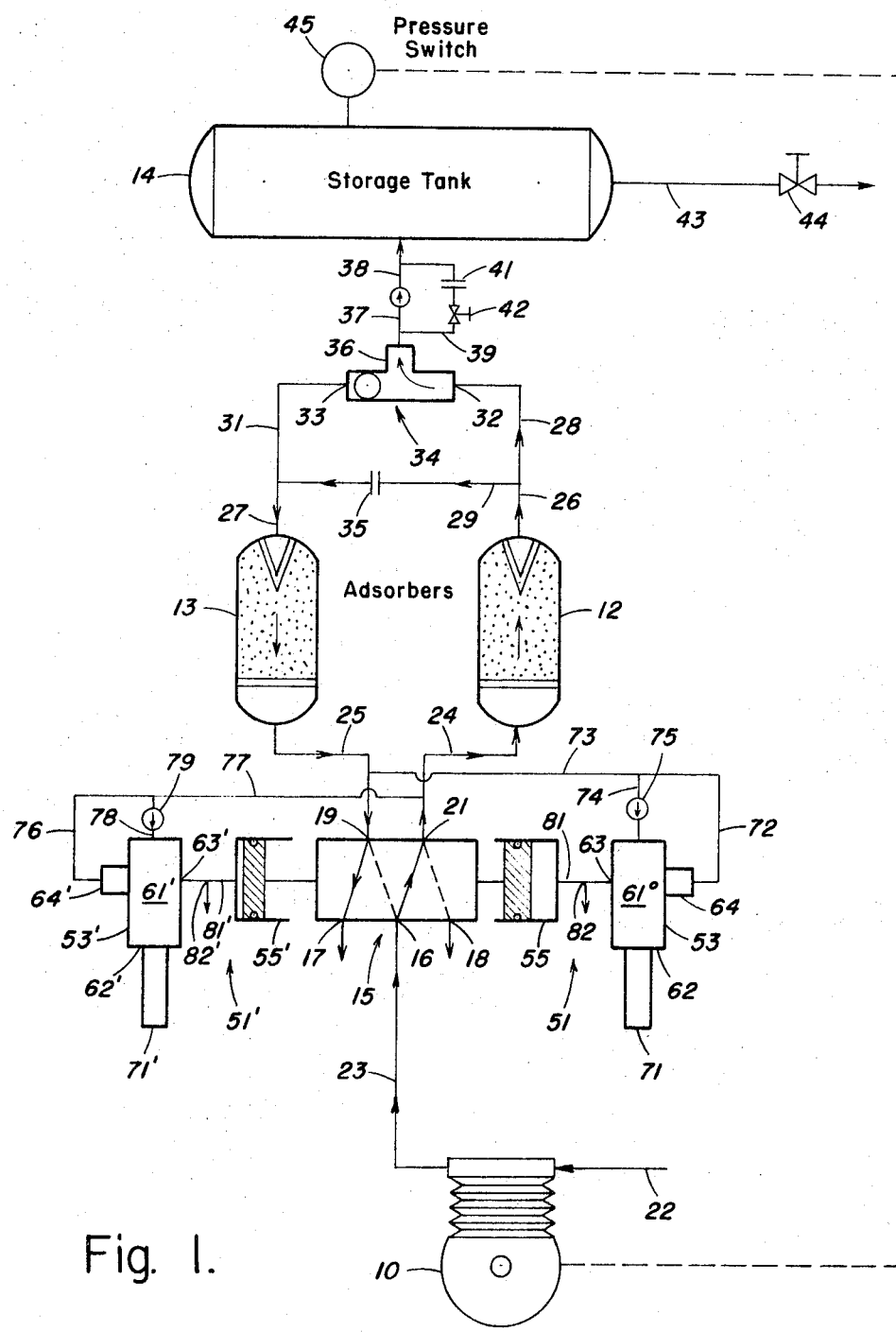
FIG. 1 is a simplified schematic representation of an embodiment of the invention.

The objects of this invention are broadly accomplished by providing a process and apparatus for adsorbing a component of a compressed gas by means of a suitable adsorbent in which adsorption of the component by the adsorbent and subsequent regeneration of the adsorbent by desorption of the component is effected when the compressor is in operation and the switching of the adsorbent from the adsorption portion of an overall cycle to the desorption portion of the overall cycle and visa versa, is controlled by deactivation of the compressor.

More particularly, a compressed gaseous mixture is passed through a first adsorbent bed to effect adsorption of one component thereof and a first unadsorbed portion of the gas is passed to a storage tank for subsequent utilization. A second unadsorbed portion of the gas is passed, at a lower pressure, through a second adsorbent bed in which the one component has previously been adsorbed to desorb the one component therefrom and thereby regenerate the bed for subsequent adsorption. The adsorption in the first bed and the desorption in the second bed is continued until a predetermined maximum pressure is obtained in the storage tank, at which time the compressor is deactivated, and the associated valving is operated in response to the deactivation of the compressor to change the flow path so that upon reactivation of the compressor adsorption is effected in the second bed and desorption in the first bed. The compressor is reactivated upon the pressure in the storage tank reaching a predetermined minimum, and adsorption is effected in the second bed and desorption in the first bed until the pressure in the storage tank again rises to a predetermined maximum, thereby deactivating the compressor and resetting the flow path for effecting adsorption in the first bed and desorption in the second bed. Thus, the adsorption and desorption is effected only when the compressor is in operation and the frequency and length of the overall cycle is a function of the amount of desorbed gas required by the utilization system.

The invention will now be described in more detail with respect to an embodiment thereof illustrated in the accompanying drawing. The invention is particularly applicable to the dehydration of compressed air and therefore the specific embodiment is described with reference to such an operation. It is to be understood, however, that the overall invention is equally applicable to fractionation by adsorption of other gaseous mixtures.

Referring to the drawing, the system for dehydrating a compressed gas includes, as principal elements, a compressor 10, two drying chambers 12 and 13 containing a suitable adsorbent, a storage tank or reservoir 14, and a four-way, five-ported pilot operated valve 15, having ports 16, 17, 18, 19 and 21, the ports 17 and 18 functioning as exhaust ports and port 16 as an inlet port for a compressed gas. The system, as illustrated in the drawing, is operating with drying being effected in chamber 12, and regeneration being effected in chamber 13, as represented by solid flow lines through pilot operated valve 15. The broken flow lines through pilot operated valve 15 is representative of the operation of the system with drying being effected in chamber 13 and regeneration being effected in chamber 12.

The compressor 10 is provided with a gas inlet conduit 22 for introducing a gas to be compressed and dehydrated, and an outlet conduit 23 connected to port 16 of pilot operated valve 15. The lower portion of drying chambers 12 and 13 are connected to ports 21 and 19, respectively, of pilot operated valve 15 through conduits 24 and 25, respectively, the conduits 24 and 25 functioning as an inlet for compressed wet gas during a drying portion of the cycle, and as an outlet for regenerating gas during a regeneration portion of the cycle. The upper portion of the drying chambers 12 and 13 are connected through conduits 26 and 27, respectively, to the junction of conduits 28 and 29 and conduits 31 and 29, respectively, the conduits 28 and 31 being connected to inlet ports 32 and 33, respectively, of a three ported, two position selector valve 34, and the conduit 29 including a suitable pressure reducing flow controller, preferably a fixed orifice, represented as 35. The conduits 26 and 27 function as an outlet for dehydrated compressed gas during the drying portion of a cycle and as an inlet for regeneration gas during the regeneration portion of the cycle, with the conduit 29 providing for the passage, as a regeneration gas, of a controlled amount of dehydrated gas from the drying chamber operating on the drying portion of the cycle to the drying chamber operating on the regeneration portion of the cycle.

The outlet port 36 of the selector valve 34, which is preferably, as shown, a ball type valve in which pressure at inlet port 32 moves the ball thereof over to port 33 to cover and close same, and pressure at inlet port 33 moves the ball over to port 32 to cover and close same, is connected to the inlet of reservoir or storage tank 14 through conduit 37, including a check valve 38, and which is further provided with a by-pass conduit 39 around check valve 38, the by-pass conduit 39 including a pressure reducing flow controller 41, preferably a fixed orifice as shown, and a valve 42. The reservoir or storage tank 14 is provided with an outlet conduit 43, including a normally open valve 44, to provide dehydrated compressed gas to a system or apparatus (not shown) employing dehydrated compressed gas and is further provided with a pressure sensitive switch, schematically represented as 45, of a type known in the art, which shuts the compressor 10 on and off in response to preset minimum and maximum pressures, respectively, in storage tank 14.

The pilot operated valve 15 is operated by two pneumatic controllers 51 and 51', each comprised of pilot valves 53 and 53' and pistons 55 and 55', respectively, with the pneumatic controller 51 functioning to move the flow control element (not shown) of pilot operated valve 15 to a position in which compressed gas inlet port 16 is connected with port 21, and port 19 is connected with exhaust port 17 (chamber 12 drying and chamber 13 regenerating), and the pneumatic controller 51' functioning to move the flow control element (not shown) of pilot operated valve 15 to a position in which compressed gas inlet port 16 is connected with port 19 and port 21 is connected with exhaust port 16 (chamber 13 drying and chamber 12 regenerating).

The pilot valves 51, 51' are three-port, two position valves having ports 61, 61', 62, 62'; and 63, 63'; and control ports 64, 64'. The ports 62, 62' of pilot valves 53, 53' are connected to volume tubes 71, 71' which store compressed air for operation of the pistons, as hereinafter described. The inlet of control port 64 is connected to conduit 25 through conduits 72 and 73, and the inlet of port 61 thereof is connected to conduit 25 through conduits 72 and 73, the conduit 74 including a check valve 75. The inlet of control port 64' of pilot valve 53' is connected to conduit 24 through conduits 76 and 77, and the inlet of port 61' thereof is connected to conduit 24 through conduits 78 and 77, the conduit 78 including a check valve 79. The ports 63, 63' of pilot valves 53, 53' are connected to pistons 55, 55' through conduits 81, 81', each including bleed vents 82, 82'. The pilot valves 53, 53' are designed so that the valve control elements thereof (not shown) interconnect ports 61, 61' with ports 62, 62' thereof, closing ports 63, 63' upon the application of a pressure to control ports 64, 64' above a predetermined pressure; and interconnect ports 62, 62' with ports 63, 63', closing ports 61, 61' upon the application of a pressure to control ports 64, 64' below the predetermined pressure.

The pistons 55, 55' function as operators for the valve control element (not shown) of pilot operated valve 15 and are operatively connected thereto, with movement of the piston 55 from right to left moving the valve control element (not shown) to a position which places chamber 12 in the drying portion of the cycle and chamber 13 in the regeneration portion of the cycle (as shown by solid lines) with the simultaneous movement of piston 55' from right to left. Similarly, movement of the piston 55' from left to right moves the valve control element (not shown) to a position which places chamber 13 in the drying portion of the cycle and chamber 12 in the regeneration portion of the cycle (as shown in broken lines) thereby simultaneously moving the piston 55 from left to right.

In a typical operation, the pressure switch 45 is set to activate the compressor 10 upon sensing a predetermined minimum pressure in reservoir 14 (for example 25 psig), and to deactivate compressor 10 upon sensing a predetermined maximum pressure in reservoir 14 (for example 35 psig.). Thus, for example, with pilot control valve 15 set to provide flow as shown in solid lines, and a pressure of 30 lbs. in reservoir 14, the pressure control switch 45 has compressor 10 turned off and the air pressure in the system upstream of check valve 38 in conduit 37 is at about 0 psig., as a result of the upstream portion being open to the atmosphere through port 17 of pilot operated valve 15. The ports 61, 61' of pilot valves 53, 53' are closed as a result of the control ports 64, 64' being subjected to 0 psig pressure. The valve 44 in conduit 43 is open and compressed gas is withdrawn, as needed, from reservoir 14 causing the pressure to drop therein.

Upon the pressure in reservoir 14 reaching the predetermined minimum, e.g., 25 psig, pressure switch 45 starts up compressor 10 whereby compressed air flows from compressor 10 through conduit 23, ports 16 and 21 of control valve 15 and conduit 24 into drying chamber 12. The compressed gas passes through the adsorbent in drying chamber 12 thereby effecting drying of the compressed gas, and a major portion of the compressed gas withdrawn from drying chamber 12 flows through conduits 26 and 28, ports 32 and 36 of selector valve 34 and conduit 37 into the reservoir 14. A minor portion of the air, the amount of which is determined by the sizing of orifice 35 and the operating pressure, flows through conduit 29 and is expanded through the orifice 35 for introduction into the drying chamber 13 through conduit 27. The dry expanded gas flows through the adsorbent in drying chamber 13 and readsorbs the water vapor adsorbed by the adsorbent during a previous drying cycle. The gas, containing readsorbed water, is withdrawn from chamber 13 through conduit 25 and is exhausted through ports 19 and 17 of control valve 15.

The pressure in conduit 24 quickly rises from 0 psig to the pressure prevailing in reservoir 14, and this pressure is transmitted to control port 64' of pilot valve 53' through conduits 77 and 76, and upon the pressure reaching a predetermined minimum, e.g., 5 psig, the flow control element (not shown) of pilot valve 62' is operated to close port 63' and open port 61' placing ports 61' and 62' in communication with each other, whereby compressed air flows through conduit 77, the check valve 79 in conduit 78 and ports 61' and 62' of pilot valve 53' into the volume tube 71' to effect a build-up of air pressure therein.

The compressor 10 compresses more air than is withdrawn from reservoir 14, and eventually the pressure in reservoir 14 is built-up to a pressure above the predetermined maximum, i.e., 35 psig, at which pressure, the pressure switch 45 shuts off compressor 10. The pressure in the reservoir 14 is locked in by closing of the check valve 38 in conduit 37, and the pressure upstream of check valve 38 again bleeds down to 0 psig by exhausting of the system through exhaust port 17 of control valve 15. The pressure in volume tube 71' connected to pilot valve 53' is locked in by closing of the check valve 79 in conduit 78, and as the pressure of the system upstream of check valve 38 in conduit 37 bleeds down to 0 psig, a pressure below the predetermined minimum (5 psig) is transmitted to control port 64' of pilot valve 53' through conduits 77 and 76, whereby the valve control element (not shown) is moved to close port 61' and open port 63' thereby placing ports 62' and 63' in communication with each other. The gas pressure in the volume tube 71' expands through ports 62' and 63' of pilot valve 53' and is transmitted to piston 55' through conduit 81', causing piston 55' to move from left to right, thereby moving the flow control element (not shown) of control valve 15 to a position in which the ports thereof are connected as shown in broken lines; i.e., the drying chamber 13 is set for the drying portion of the cycle and the drying chamber 12 is set for the regeneration portion of the cycle upon the compressor 10 being started by the pressure sensitive switch 45. The pressure on piston 55' and in volume tube 71' is gradually reduced to 0 psig through the bleed vent 82' in conduit 81'.

The cycle is again initiated upon the pressure reaching a predetermined minimum in reservoir 14, with chamber 12 being regenerated and chamber 13 effecting drying of compressed gas and upon the pressure in reservoir 14 again reaching the predetermined maximum, the compressor 10 is stopped and the pilot valve 53 in conjunction with piston 55 operate to move the valve control element (not shown) of valve controller 15, in a manner similar to the operation of pilot valve 83' and piston 55', as hereinabove described, to connect drying chamber 12 to the drying portion of the cycle and drying chamber 13 to the regeneration portion of the cycle.

In some cases, in order to establish a desired dessicant dryness, over reactivation of the dessicant may be required. An excess regeneration of the dessicant may be achieved by opening valve 42 in by-pass conduit 39 after the compressor 10 is shutdown, whereby a small amount of air, as controlled by orifice 41 in by-pass conduit 39, is passed from reservoir 14 through by-pass conduit 39 and selector valve 34 to the chamber which has just completed the drying cycle and is now connected for the regeneration cycle upon reactivation of compressor 10. If desired, total regeneration or reactivation may be achieved by closing the valve 44 in outlet conduit 43 whereby all of the air in reservoir 14 may be returned through the drying chamber.

As should be apparent from the hereinabove description of a preferred embodiment of the invention, each time the compressor is activated, one drying chamber is adsorbing water and the other is being desorbed of water, and each time the compressor is deactivated, the selector valve is automatically pneumatically operated to interchange the drying and regeneration cycle for the drying chambers, with regeneration and drying being effected only when the compressor is in operation.

The invention has been particularly described with respect to the dehydration of air, but it is to be understood that the invention is equally applicable to both the dehydration of other gases, and the fractionation of gases to selectively adsorb a component other than water, although the invention is particularly applicable to the dehydration of a gas. The use of a dual tower adsorbent system for fractionation of other gaseous mixtures and the adsorbents used therefor is generally known in the art and, therefore, a detailed explanation in this respect is not required for a full understanding of the invention. The application of such a system to other fractionation operations and suitable adsorbents therefor is disclosed, for example, in the aforementioned U.S. Pat. No. 2,944,627, which is hereby incorporated by reference.

Figure 2:
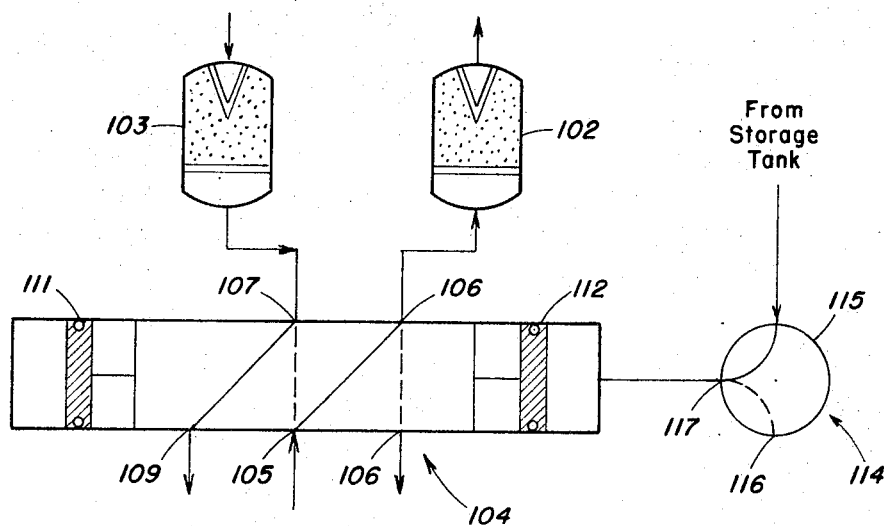
FIG. 2 is a simplified schematic representation of a portion of another embodiment of the invention.

Similarly, the hereinabove described embodiment of the invention is only illustrative of a preferred embodiment and numerous other modifications and embodiments are included within the spirit and scope of the invention. Thus, for example, the valve for directing the flow from the compressor to the adsorbing chambers may be actuated by air pressure under control of a solenoid valve, although such an embodiment is less preferred. In such a modification, as shown in FIG. 2 which illustrates only the control valve portion of the overall system and the dual adsorption chambers with the storage tank being arranged as described with respect to and illustrated in FIG. 1, the flow from the compressor (not shown) to the dual chambers 102 and 103 is controlled by a four-way five-ported valve schematically represented as 104, including a port 105 as an inlet port for the compressed gas, port 106 for connecting the valve 104 to the adsorption chamber 102, port 107 for connecting the valve 104 to the adsorption chamber 103, and exhaust ports 108 and 109 for chambers 102 and 103, respectively. The solid flow lines through valve 104 represent drying in chamber 102 and regeneration in chamber 103 and the broken lines therethrough represent drying in chamber 103 and regeneration in chamber 102.

The flow control element (not shown) of valve 104 is operatively connected at one end to a spring operated piston 111 and at the other end to a pneumatic operated piston 112, the pistons 111 and 112 functioning as operators for the valve control element, with movement of the piston 112 from right to left moving the valve control element (not shown) to a position which directs flow as shown in solid lines and movement of the piston 111 from left to right moving the valve control element (not shown) to a position which directs flow as shown in broken lines.

A two way-three ported solenoid operated valve, schematically indicated as 114, controls the operation of piston 112 with port 115 thereof being connected to either the storage tank (not shown) containing compressed gas or another source of gas under pressure; port 116 thereof to vent; and port 117 thereof to the piston 112. The flow control element (not shown) of solenoid operated valve 114 either interconnects ports 115 and 117 whereby compressed air is introduced into piston 112 causing piston 112 to move from right to left whereby flow through valve 104 is as shown in solid lines; or interconnects ports 116 and 117 whereby piston 112 is open to vent (atmospheric pressure) and the spring operated piston moves from left to right to direct flow through valve 104 as shown in broken lines.

The solenoid operated valve is connected into the circuit operating the compressor through a stepping relay, as generally known in the art, whereby stopping of the compressor alternately energizes and deenergizes solenoid operated valve 114, with ports 115 and 117 being interconnected upon energization of the solenoid operated valve and ports 116 and 117 being interconnected upon deenergization of the solenoid operated valve 114. It should be readily apparent to those skilled in the art that these functions can be reversed. In this manner, similarly to the embodiment of FIG. 1, each time the compressor is deenergized, the cycle through the dual adsorption chambers is reversed; i.e., the chamber in which adsorption was being effected is switched to regeneration and the chamber in which regeneration was being effected is switched to adsorption.

Figure 3:
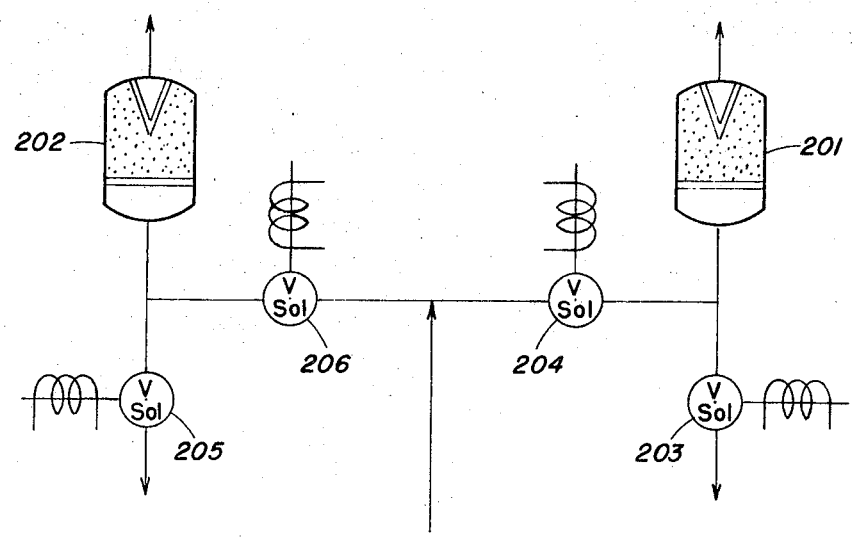
FIG. 3 is a simplified schematic representation of a portion of a further embodiment of the invention.

As a further modification, more than one valve may be employed for directing flow of compressed gas to each of the adsorbing chambers and for directing the gas containing the desorbed component from the chambers, in which case each valve is operated in response to deactivation of the compressor to alternate between adsorption and desorption. Thus, for example, as schematically represented in FIG. 3, there is provided dual adsorption chambers 201 and 202, with adsorption chamber 201 being connected to purge through solenoid operated valve 203 and to the compressor (not shown) through solenoid operated valve 204. Similarly, adsorption chamber 202 is connected to purge through solenoid operated valve 205 and to the compressor (not shown) through solenoid operated valve 206. The solenoid operated valves 203, 204, 205 and 206, as hereinabove described with reference to the embodiment of FIG. 2, are connected into the circuit operating the compressor through a stepping relay, as generally known in the art, whereby stopping of the compressor alternately energizes and deenergizes all of the solenoid operated valves 203, 204, 205 and 206. The solenoid valves 203 and 205 are in open position and solenoid valves 204 and 206 are in closed position upon energization thereof, whereby chamber 201 is adsorbing and chamber 202 is being desorbed and solenoid valves 204 and 206 are in open position and solenoid valves 203 and 205 are in closed position upon deenergization thereof, whereby chamber 202 is adsorbing and chamber 201 is being regenerated. It should be readily apparent that the operation of the solenoid valves may be other than as particularly described provided the adsorption and regeneration cycles for each chamber are changed in response to deactivation of the compressor. It should also be apparent that the four valves could be replaced by two three-way valves.

As a further modification, the control valve could be a four-way, four-ported 90° rotating valve having the valve control element thereof operated by a ratchet drive mechanism being operated by a spring activated arm. The spring is maintained in a compressed state during operation of the compressor by air pressure from the compressor and each time the compressor is deactivated the pressure is reduced to zero, whereby the spring moves the arm to operate the ratchet to rotate the valve control element 90° to switch the adsorption and regeneration cycle. Upon reactivation of the compressor, the spring is again compressed and the ratchet drive mechanism is moved into a position to move the valve control element another 90° upon deactivation of the compressor.

It is also to be understood that the system could be operated such that the cycles are switched in response to deactivation of the compressor in a manner other than as described; e.g., the cycle is successively reversed in response to the compressor being deactivated two or more times instead of reversing the cycle each time the compressor is deactivated as particularly described.

Numerous other modifications should be apparent to those skilled in the art from the teachings herein.

The present invention is an improvement over prior art dual tower systems in that a storage tank is provided downstream of the adsorption towers and the regeneration and adsorption cycles are controlled in response to compressor on-time. In this manner, regeneration is effected only during compressor on-time which is a function of the demand of the utilization system, resulting in the volume of gas employed for regeneration being proportional to the demand requirements of the utilization system. Moreover, the compressor operates at a fixed output volume of air, with the demands of the utilization system being controlled by the on-time of the compressor and, therefore, the volume of gas required for regeneration of the adsorbent is adjusted and fixed in relation to this volume, thereby eliminating the considerable waste of gas which results in the prior art systems in which the regeneration gas requirements must be adjusted and fixed for the maximum load demands of the utilization system. In addition, the preferred embodiment of the invention includes fluid components for alternating the adsorption and desorption cycles, which are more reliable than the combination of timer and solenoid valves employed in prior art systems.

These and other advantages should be apparent to those skilled in the art from the teachings herein.

Numerous modifications and variations of the present invention are possible in light of the above teachings and, therefore, within the scope of the appended claims the invention may be practised other than as particularly described.

What is claimed is:

1. A process for fractionating by adsorption a gaseous mixture of at least two components, comprising:
   a. passing the compressed gaseous mixture through a first adsorbent bed to adsorb one component of the mixture;
   b. passing a first unadsorbed portion of the mixture to a storage zone;
   c. passing a second unadsorbed portion of the mixture through a second adsorbent bed, at a reduced pressure, to desorb from said second adsorbent bed said one component previously adsorbed therein;
   d. stopping compression and stopping passage of the compressed gaseous mixture to the first adsorbent bed; said steps (a) through (d) comprising a first portion of the overall cycle;
   e. restarting compression of said gaseous mixture;
   f. passing the compressed gaseous mixture from step (e) through the second adsorbent bed to adsorb said one component of the mixture;
   g. passing a first unadsorbed portion of the mixture from step (f) to the storage zone;
   h. passing a second unadsorbed portion of the mixture from step (f) through the first adsorbent bed to desorb from said first adsorbent bed said adsorbed one component;
   i. stopping compression and stopping passage of the compressed gaseous mixture to the second adsorbent bed, said steps (e) through (i) comprising a second portion of the overall cycle;
   j. restarting compression of said gaseous mixture; and
   k. repeating the first and second portions of the cycle.

2. The process as defined in claim 1 wherein compression is stopped in steps (d) and (i) of claim 2 in response to a predetermined maximum pressure in said storage zone and compression is restarted in steps (e) and (j) of claim 2 in response to a predetermined minimum pressure in said storage zone.

3. The process as defined in claim 2 and further comprising controlling the flow of the compressed gaseous mixture to the first and second adsorbent beds by a valve means; moving the valve means to switch flow of the compressed gaseous mixture from the first adsorbent bed to the second adsorbent bed upon stopping the compression in step (d) to prepare for said second portion of the cycle, said switching of the valve means being effected pneumatically by a portion of the compressed gaseous mixture; and moving the valve means to switch flow of the compressed gaseous mixture from the second adsorbent bed to the first adsorbent bed upon stopping the compression in step (i) to prepare for said first portion of the cycle, said switching of the valve means being effected pneumatically by a portion of the compressed gaseous mixture.

4. The process as defined in claim 2 and further comprising: controlling the flow of the compressed gaseous mixture to the first and second adsorbent beds by a fluid operated valve means; storing a portion of the compressed gaseous mixture during the first portion of the cycle in another storage zone, passing the stored compressed gaseous mixture from the another storage zone to the fluid operated valve means in response to stopping of said compression in step (d) of claim 2 to operate said fluid operated valve means to switch flow of the compressed gaseous mixture from the first adsorbent bed to the second absorbent bed upon restarting of the compression; storing a portion of the compressed gaseous mixture during the second portion of the cycle in a further storage zone, and passing the stored compressed gaseous mixture from the further storage zone to the fluid operated valve means in response to stopping of said compression in step (i) of claim 2 to operate said fluid operated valve means to switch flow of the compressed gaseous mixture from the second adsorbent bed to the first adsorbent bed upon restarting of the compression.

5. The process as defined in claim 2 and further comprising controlling flow of the compressed gaseous mixture to the first and second adsorbent beds by a solenoid operated valve means; alternately energizing and deenergizing said solenoid operated valve means in response to deactivation of said compressor, said energization and deenergization of the solenoid operated valve means alternately directing flow of the compressed gaseous mixture to the first and second adsorbent beds.

6. The process as defined in claim 2 wherein the gaseous mixture is wet air and said adsorption is effected to dry the air.

7. An apparatus for adsorptive fractionation of a gaseous mixture comprising:
   first and second vessels each containing an adsorbent; a compressor; a first conduit means including a valve means connecting said compressor to each of said first and second vessels to provide a compressed gas inlet conduit means, said valve means alternately directing flow of said compressed gaseous mixture to the first and second vessels through the inlet conduit means to alternately pass the compressed gaseous mixture through the adsorbent thereof to adsorb one component of the gaseous mixture; a storage tank; primary outlet means connected to the storage tank and each of the first and second vessels, said primary outlet means alternately passing to the storage tank from each of the first and second vessels a first unadsorbed portion of the gaseous mixture; regeneration conduit means interconnecting each of the first and second vessels, said regeneration conduit means alternately passing from one of the first and second vessels through the adsorbent of the other a second unadsorbed portion of the gaseous mixture to effect desorption of the one component therefrom; secondary outlet means connected to each of the first and second vessels for alternately withdrawing from each a gaseous mixture containing the desorbed one component; and first control means responsively connected to said compressor and operatively connected to the valve means to operate said valve means in response to operation of the compressor to alternately direct flow of said compressed gaseous mixture to said first and second vessels, said first control means operating said valve to change the flow in response to stopping of said compressor, whereby in response to stopping of the compressor the first and second vessels are switched between adsorption and desorption.

8. The apparatus as defined in claim 7 and further comprising a second control means operatively connected to the compressor and responsive to pressure in said storage tank, said second control means starting the compressor in response to a minimum pressure in said storage tank and stopping the compressor in response to a maximum pressure in said storage tank.

9. The apparatus as defined in claim 8 wherein said valve means is a pneumatically operated valve means.

10. The apparatus as defined in claim 8 wherein said valve means is a solenoid operated valve means, said first control means alternately energizing and deenergizing said solenoid operated valve means in response to deactivation of said compressor to change said flow.

11. The apparatus as defined in claim 7 wherein the valve means is a pilot operated valve and said first control means comprises first and second fluid operated piston means and first and second pilot valve means, said first and second piston means being operatively connected to said pilot operated valve, operation of said first piston means operating said pilot operated valve to connect said first vessel to adsorption and operation of said second piston means operating said pilot operated valve to connect said second vessel to adsorption; first means connecting the first pilot valve means to said first piston means; second means connecting said second pilot valve means to said second piston means; first and second volume storage means connected to the first and second pilot valve means, respectively; third means connecting the first pilot valve means to the inlet conduit means connected to the second vessel; fourth means connecting the second pilot valve means to the inlet conduit means connected to the first vessel; said first pilot valve means including a first pressure responsive flow control means operated by fluid pressure transmitted to the pilot valve by said third means, said first flow control means being operated by a first pressure in said inlet conduit means connected to the first vessel upon starting the compressor to place the first volume storage means in fluid flow communication with the third means, whereby compressed gas from the inlet conduit means connected to the second vessel flows to the first volume storage vessel, being operated by a second pressure in said inlet conduit connected to the first vessel upon stopping the compressor to place the first volume storage means in fluid flow communication with the first piston means through said first means to operate said first piston means, whereby said pilot operated valve connects the first vessel to adsorption, said second pilot valve means including a second pressure responsive flow control means operated by fluid pressure transmitted to the pilot valve by said fourth means, said second flow control means being operated by a first pressure in said inlet conduit means connected to the second vessel upon starting the compressor to place the second volume storage means in fluid flow communication with the fourth means, whereby compressed gas from the inlet conduit means connected to the second vessel flows to the second volume storage vessel, being operated by a second pressure in said inlet conduit connected to the second vessel upon stopping the compression to place the second volume storage means in fluid flow communication with the second piston means through said second means to operate said second piston means, whereby said pilot operated valve connects the second vessel to adsorption.

12. An apparatus for adsorptive fractionation of a gaseous mixture comprising:
first and second vessels each containing an adsorbent; a compressor; first conduit means including a valve means connecting said compressor to each of said first and second vessels to provide a compressed gas inlet conduit means, said valve means alternately directing flow of said compressed gaseous mixture to the first and second vessel through the inlet conduit means to alternately pass the compressed gaseous mixture through the adsorbent thereof to adsorb one component of the gaseous mixture; a storage tank; utilization conduit means connected to said storage tank for passing the unadsorbed portion of the gaseous mixture stored therein to a utilization system in response to the demands thereof; primary outlet means connected to the storage tank and each of the first and second vessels, said primary outlet means alternately passing to the storage tank from each of the first and second vessels a first unadsorbed portion of the gaseous mixture; regeneration conduit means interconnecting each of the first and second vessels, said regeneration conduit means alternately passing from one of the first and second vessels through the adsorbent of the other a second unadsorbed portion of the gaseous mixture to effect desorption of the one component therefrom; secondary outlet means connected to each of the first and second vessels for alternately withdrawing from each a gaseous mixture containing the desorbed one component; first control means operatively connected to the compressor and responsive to pressure in said storage tank, said first control means starting the compressor in response to a minimum pressure in said storage tank and stopping the compressor in response to a maximum pressure in said storage tank, whereby said compressor operates only in response to demands of the utilization system.

* * * * *